United States Patent
Castagnos, Jr. et al.

(10) Patent No.: US 8,480,965 B2
(45) Date of Patent: Jul. 9, 2013

(54) DEVICES FOR INJECTION OF GASEOUS STREAMS INTO A BED OF FLUIDIZED SOLIDS

(75) Inventors: Leonce Francis Castagnos, Jr., Montgomery, TX (US); Ting Yee Chan, Bellaire, TX (US); Norman Paul Kolb, Houston, TX (US); Ronald Eugene Pieper, Kingwood, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 0 days.

(21) Appl. No.: 13/314,394

(22) Filed: Dec. 8, 2011

(65) Prior Publication Data

US 2012/0103869 A1    May 3, 2012

Related U.S. Application Data

(63) Continuation of application No. 12/418,943, filed on Apr. 6, 2009, now Pat. No. 8,092,755.

(51) Int. Cl.
| | |
|---|---|
| *B01J 8/02* | (2006.01) |
| *B01J 35/02* | (2006.01) |
| *B01J 19/00* | (2006.01) |
| *B01J 8/18* | (2006.01) |
| *B01J 29/70* | (2006.01) |
| *F27B 15/00* | (2006.01) |
| *F27B 15/08* | (2006.01) |
| *C10G 47/00* | (2006.01) |
| *C10G 47/02* | (2006.01) |
| *C10G 47/24* | (2006.01) |

(52) U.S. Cl.
USPC ........... 422/220; 422/129; 422/139; 422/144; 422/211; 208/46; 208/106; 208/107; 208/108

(58) Field of Classification Search
USPC ........... 422/129, 139, 144, 211, 220; 208/46, 208/106–108
See application file for complete search history.

(56) References Cited

U.S. PATENT DOCUMENTS

| | | | |
|---|---|---|---|
| 3,311,305 | A | 3/1967 | Crownover |
| 4,223,843 | A | 9/1980 | Smith et al. |
| 4,460,130 | A | 7/1984 | Baumann et al. |
| 5,178,333 | A | 1/1993 | Barber et al. |
| 5,190,731 | A | 3/1993 | Stahl |

(Continued)

FOREIGN PATENT DOCUMENTS

RU    2217672 C1    11/2003

OTHER PUBLICATIONS

Fluid Catalytic Cracking by Joseph W. Wilson pp. 134-142.

(Continued)

*Primary Examiner* — Jill Warden
*Assistant Examiner* — Natasha Young
(74) *Attorney, Agent, or Firm* — Osha Liang LLP

(57) ABSTRACT

Injection nozzles for use in a gas distribution device are disclosed. In one aspect, the injection nozzle may include: a tube having a fluid inlet and a fluid outlet; wherein the inlet comprises a plurality of flow restriction orifices. In another aspect, embodiments disclosed herein relate to an injection nozzle for use in a gas distribution device, the injection nozzle including: a tube having a fluid inlet and a fluid outlet; wherein the fluid inlet comprises an annular orifice surrounding a flow restriction device. Injection nozzles according to embodiments disclosed herein may be disposed in a gas distribution manifold used in a vessel, for example, for conducting polymerization reactions, spent catalyst regeneration, and coal gasification, among others.

19 Claims, 12 Drawing Sheets

U.S. PATENT DOCUMENTS

| | | | |
|---|---|---|---|
| 5,314,610 A | 5/1994 | Gartside | |
| 6,110,440 A * | 8/2000 | Ohta et al. | 423/351 |
| 6,907,751 B2 | 6/2005 | Kalbassi et al. | |
| 7,077,997 B1 * | 7/2006 | Sandacz | 422/144 |
| 2007/0237692 A1 | 10/2007 | Burd | |

OTHER PUBLICATIONS

International Search Report and Written Opinion of the International Searching Authority issued for International Application No. PCT/US2010/030076 on Jun. 29, 2010.

Patent Examination Report No. 1 issued Sep. 12, 2012 in corresponding Australian application No. 2010234639 (3 pages).

Office Action issued in corresponding Canadian Application No. 2,753,521 dated Oct. 30, 2012 (3 pages).

Office Action issued in corresponding Korean Application No. 10-2011-7024408 with translation dated Dec. 21, 2012 (8 pages).

Official Action issued in corresponding Russian Application No. 2011144571/02 dated Dec. 12, 2012 (22 pages).

* cited by examiner

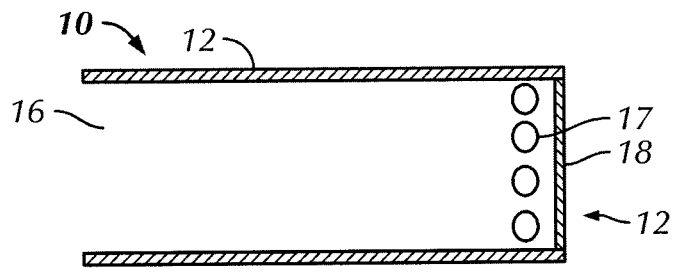 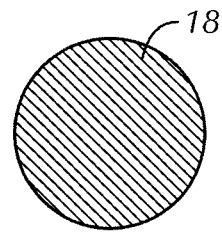
FIG. 2A  FIG. 2B
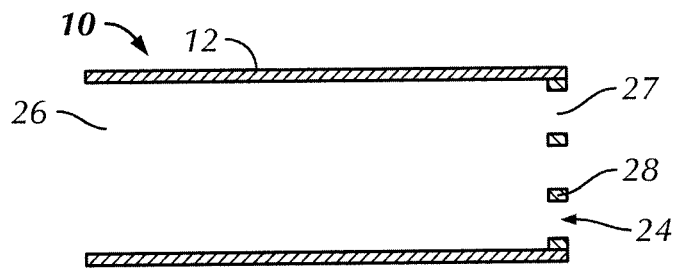 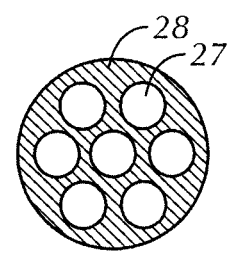
FIG. 3A  FIG. 3B
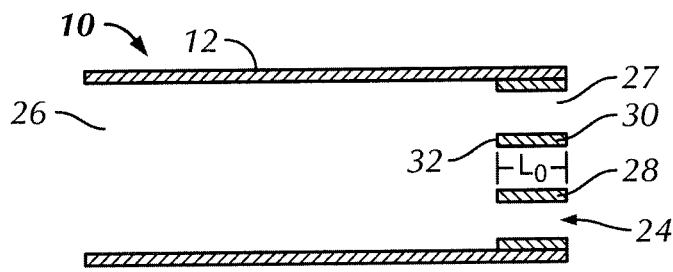 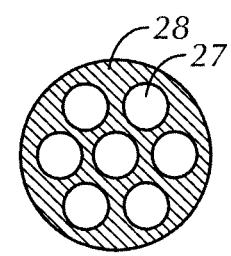
FIG. 4A  FIG. 4B
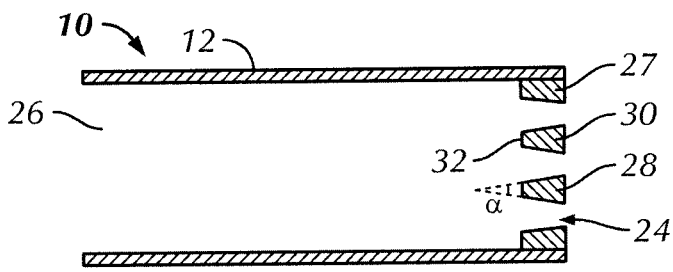 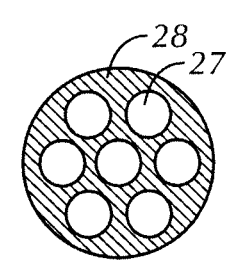
FIG. 5A  FIG. 5B

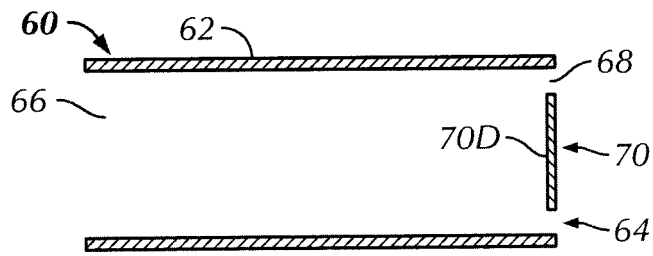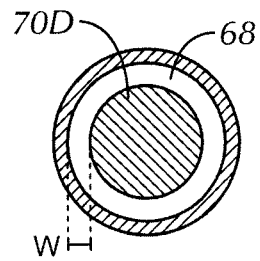
*FIG. 6A*  *FIG. 6B*
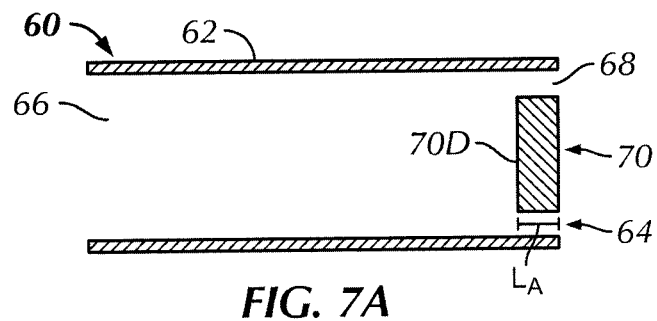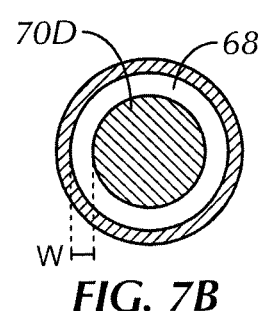
*FIG. 7A*  *FIG. 7B*
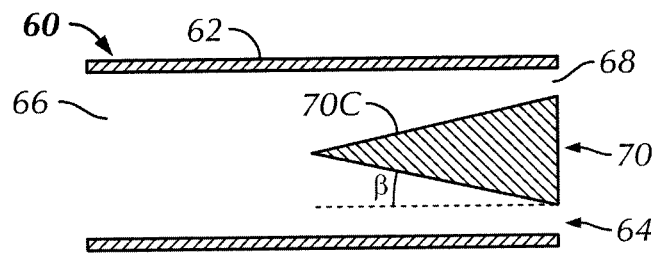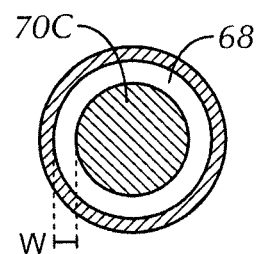
*FIG. 8A*  *FIG. 8B*
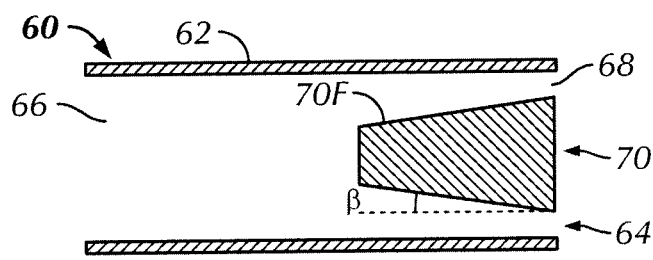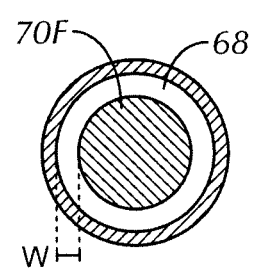
*FIG. 9A*  *FIG. 9B*

Looking Down the Header Branch
in the Direction of Air Flow

Branch
Velocity
35 ft/sec

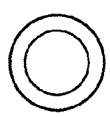
*FIG. 15A*
*FIG. 15B*
*FIG. 15C*
*FIG. 15D*
*FIG. 15E*
*FIG. 15F*
*FIG. 15G*
*FIG. 15H*
*FIG. 15I*
*FIG. 15J*
*FIG. 15K*
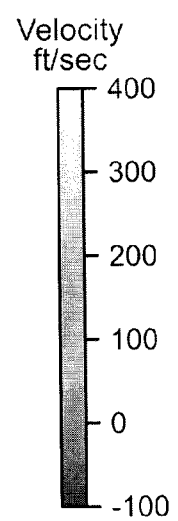

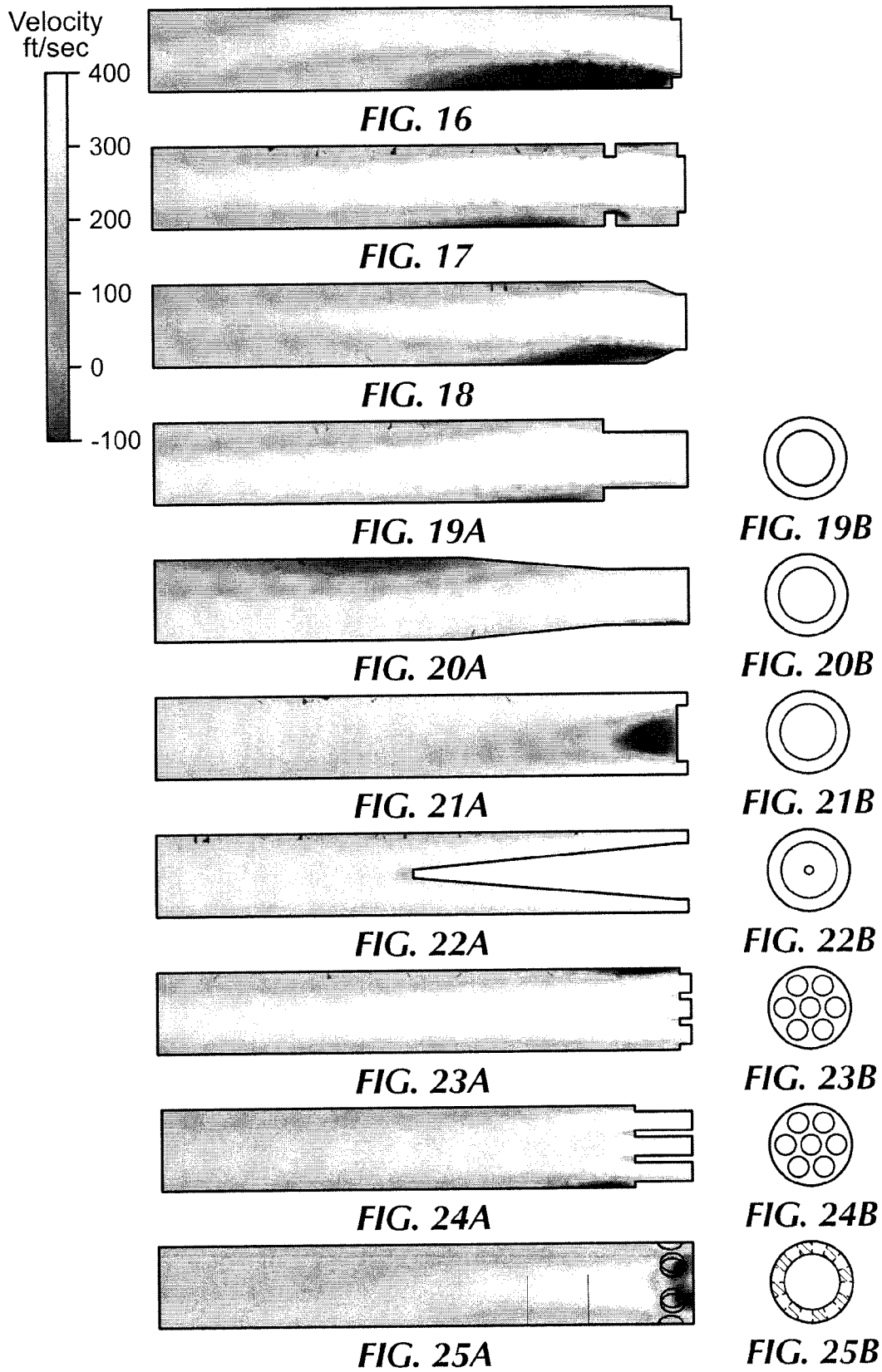

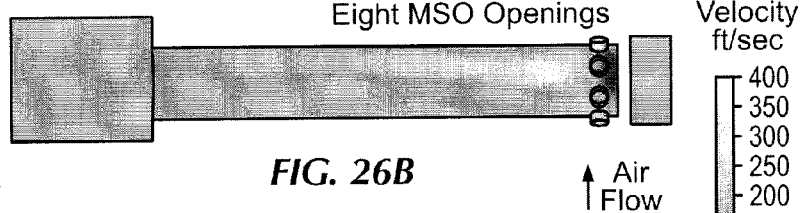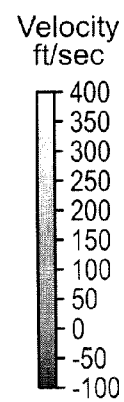
FIG. 26A  FIG. 26B
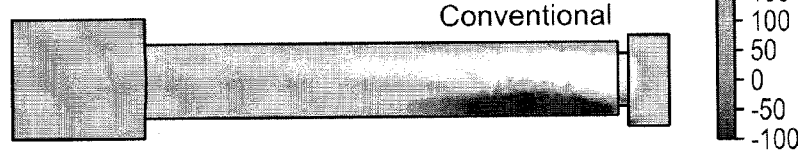
FIG. 27A  FIG. 27B
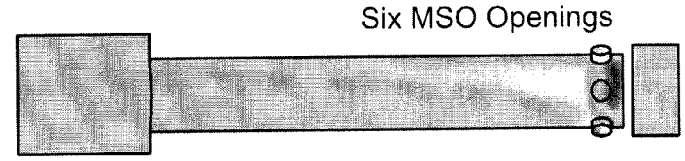
FIG. 28A  FIG. 28B
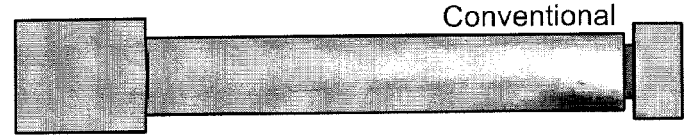
FIG. 29A  FIG. 29B
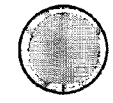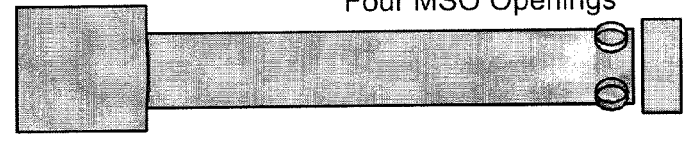
FIG. 30A  FIG. 30B
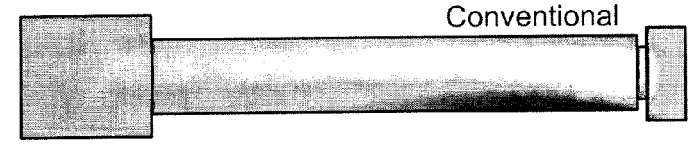
FIG. 31A  FIG. 31B

DEVICES FOR INJECTION OF GASEOUS STREAMS INTO A BED OF FLUIDIZED SOLIDS

CROSS-REFERENCE TO RELATED APPLICATION

This application, pursuant to 35 U.S.C. §120, claims benefit to U.S. patent application Ser. No. 12/418,943 filed Apr. 6, 2009, now U.S. Pat. No. 8,092,755. That application is incorporated by reference in its entirety.

BACKGROUND OF DISCLOSURE

1. Field of the Disclosure

Embodiments disclosed herein relate generally to an apparatus for the injection of a gaseous stream into a bed of fluidized solids. More specifically, embodiments disclosed herein relate to an injection nozzle.

2. Background

In the refining and chemical process industries, as well as in other processing industries, it is often necessary to inject a gaseous stream into a bed of finely divided solids, uniformly spreading the gas over the cross section of the bed and. The injection of the gas is designed to promote uniform and intimate contact of the gaseous medium with the bed of solids so as to achieve a purpose, such as a chemical reaction between the gas and solids and/or a mass transfer operation between the gas and solids.

Apparatus for injecting the gas into a fluidized bed typically consists of a flat grid plate with holes, a pipe grid system, or a series of concentric rings. These distributors are designed to physically cover as much of the bed cross section as possible so as to promote the even distribution of the gas across the entire bed. Gas is introduced into the space beneath the flat plate distributor or into the main header of a pipe grid and/or the ring distributor from a central source. From there the gas flows throughout the pipe grid or ring system and then discharges into the bed through a multiplicity of nozzles that distribute the gas uniformly into the bed. Plate grid distributors are typically not completely flat but are dished slightly up or down so as to better withstand the pressure exerted by the gas and/or the weight of the bed of solids above. Plate grid distributors may or may not contain nozzles, but typically only use a pattern of holes laid out in the plate to allow gas to flow through into the bed. Other embodiments of gas distributors for fluid beds of solids include dome type distributors and so-called "mushroom" distributors.

In order to achieve uniform distribution of the gas medium, the injection nozzles are typically designed with a cross sectional area that will cause a pressure drop to occur as the gas flows through the injection nozzles from the distribution header into the bed of solids. The maintenance of a positive pressure drop across the injection nozzles insures that the gas flows evenly to all of the injection nozzles in spite of differences that can occur in the pressure in the bed at the point of discharge. Once the gas flows upward through the bed of solids, the bed becomes "fluidized" and begins to behave as a liquid. Such a fluidized bed of solids will exert a pressure proportional to the depth of the bed and the density of gas/solids mixture in the same manner as would a liquid of similar density and depth. Typically, such beds of fluidized solids will range in depth from a few feet to as much as 30 feet or more and will exhibit a measured density ranging from a few pounds per cubic foot to over 40 pounds per cubic foot. The resulting pressure exerted by the column of fluidized solids will range from as little as 1 pound per square inch (psi) to as high as 10 psi or more. Moreover, the bed of solids is often quite turbulent, meaning the pressure at any one point in the bed fluctuates with time and will vary from point to point at a given depth in the bed. For this reason, it is important to design gas distributors with sufficient pressure drop so as to overcome the pressure fluctuations that are expected at the location of the gas distributor in the bed. A typical "rule of thumb" for the design of gas distributors is that the minimum pressure drop should be 15% of the bed pressure drop for downward pointed injection nozzles and 30% of the bed pressure drop for upward pointed distributors.

In addition to maintaining a minimum pressure drop for uniform distribution of the gas medium, injection nozzles are also designed to discharge the gas into the bed at relatively high velocity. If the gas velocity is too low, pressure pulsations can momentarily cause solids to be pressured backwards and flow from the bed into the injection nozzle. Such backflow of solids into an injection nozzle is undesirable as it can lead to erosion of the injection nozzle from the continued scouring action of the solids and/or plugging of an injection nozzle if the solids become lodged into a solid mass. Moreover, if the solids are pressured far enough into an injection nozzle, they can then enter the main header where they are picked up by the flowing gas to be discharged in one or more injection nozzles farther downstream. In such latter case, the result may be severe erosion in one or more injection nozzles downstream from the nozzle through which the solids entered the header. To prevent backflow of solids into the injection nozzles, the velocity in the nozzles is generally maintained above a certain minimum value, typically above about 20 feet per second (fps).

A problem that continues to plague gas distributors in fluid beds is erosion of the injector nozzles at the point of discharge into the bed of solids. Over a long period of time, the impact of solid particles at the discharge edge of the injector will cause gradual wear at the injector tip. As the wear increases, the end of the nozzle can erode far enough back so as to destroy the point of attachment where the injector nozzle passes through the header. The result is a hole in the header and a loss of performance of the distributor. When this occurs, expensive and time consuming repairs are required to restore the performance of the grid or ring.

One widely used process in the petroleum refining industry that makes use of beds of finely divided solids is the fluid catalytic cracking (FCC) process. The FCC process is used for the cracking of heavy boiling gas oil streams to produce more valuable, lighter boiling products, such as gasoline and lighter hydrocarbons. The FCC process uses solid catalysts in powder form to facilitate the breaking of the carbon-carbon atomic bonds of the gas oil feed to form smaller molecules that lie within the gasoline boiling range. In addition to the gasoline product, the process also produces substantial yields of lighter gases, such as propane and butane, which are recovered and converted to valuable products. Fluid catalytic cracking is the most widely used "conversion" process in petroleum refining and several million barrels per day of FCC capacity have been installed since the process inception in the early 1940's. As such, the FCC process is of great economic value and is typically the most profitable unit in a petroleum refinery in the United States as well as in most refineries around the world.

The catalyst used in the FCC process is a finely divided solid composed of mostly silica and alumina in both crystalline and amorphous form. The use of a powdered catalyst has been the key feature contributing to the success of the FCC process and has lead to the development of an entire area of process operations that has come to be known as "fluidization." The finely divided powder catalyst can be made to behave as a fluid when it is properly aerated or "fluidized" by means of air or another gas. The fluidized powder can be made to flow in lines and will establish a level within a vessel, as would a liquid. A fluidized power will also generate a hydraulic pressure head proportional to the density and the depth of the mixture within a vessel or in a vertical standpipe as would a fluid. The powder can also be pneumatically transported by a gas stream when the gas has sufficient velocity. The ability to flow the powdered catalyst between vessels has been of tremendous benefit in the development of a viable catalytic cracking process. Earlier attempts to use a fixed bed of catalyst pellets were largely handicapped by the need to regenerate the catalyst frequently to remove deposits of "coke" that are a by-product of cracking. The coke, mostly carbon with some hydrogen and sulfur, deactivates the catalyst and must be removed by means of a combustion step. By use of a "fluidizable" catalyst, the catalyst can be continuously circulated between the reaction and regeneration vessels of a FCC unit so that there is no need for a cyclical process in order to accomplish the reaction and regeneration steps.

In the FCC process large volumes of air are used in the Regenerator vessel to remove coke from the catalyst and restore catalyst activity. The air is typically injected into a bed of coked catalyst by means of pipe grid or ring type distributors. The FCC process also makes use of large pipe or ring type distributors in the stripping section where the spent catalyst is contacted with steam to remove entrained hydrocarbons before the catalyst is sent to the regenerator. Smaller pipe or ring distributors are used elsewhere in the FCC process to inject either steam or air to keep the powdered catalyst in a "fluidized" or aerated state. Injection nozzles used in each of these areas of the FCC process may be subject to erosion, as described above.

A number of attempts have been made to improve injection nozzle design to reduce the harmful effects of erosion and extend the useful life of the distributor. These include the use of exotic alloys and ceramic materials to make the injection nozzle itself harder and more resistant to erosion, protecting the discharge end of the injection nozzle with hard surfacing such as metal overlays or refractory layers, and/or changes in the design of the nozzle.

A current state-of-the-art air distributor design for an FCC regenerator makes use of a pipe grid distributor and a two-stage injection nozzle design. Such a design is shown in FIG. 1A, which is a plan view of a pipe grid distributor consisting of three identical grids in a triangular arrangement to cover the circular cross-section of an FCC Regenerator. FIG. 1B is an elevation view of one of the pipe grids showing how the main air supply trunk enters from the bottom, with three branches that also support the grid. All of the grids are installed at the same elevation in the bed of powdered catalyst so as to have, as nearly as possible, a uniform pressure into which the air is discharged. FIG. 1C is a cross section of one of the grid arms showing the arrangement of the downward-directed nozzles at 45 degrees from vertical. This pipe grid design has proven very efficient at physically distributing the air over the cross section of the catalyst bed so that the coke burning is uniform.

FIG. 1D is a cross section of one of the air injection nozzles that utilizes a two-stage or so-called "Borda" tube. FIGS. 1E-1H contains various views showing the nozzle arrangement inside one of the grid arms. The metal grid arms are covered in erosion resistant refractory to protect both the grid arms themselves and the final length of the injection nozzles from erosion by the wearing action of the catalyst particles.

The Borda tube or two-stage nozzle consists of a straight tube with a concentric orifice at the inlet end. In the Borda tube design, the orifice is sized so as to provide sufficient pressure drop to promote uniform distribution of air across the grid, where the pressure drop is typically between about 1 and 3 psi. The orifice is followed by a larger diameter tubular section that slows down the gas so that the discharge velocity into the bed of solids does not cause excessive erosion and/or attrition of the catalyst. See, for example, Joseph W. Wilson, "Fluid Catalytic Cracking," p. 140-141, Penwell Publishing, 1997, describing use of a Borda tube as an injection nozzle in FCC applications.

The recommended length for the Borda tube is a minimum of six times the tube diameter to allow the flow in the tube to become fully developed following the nozzle orifice. It has been established in practice that, if the nozzle is too short, the flow at the discharge will be turbulent and excessive erosion will result at the nozzle tip.

Although the Borda tube design and the use of hard materials for construction of the nozzle and/or protection of the nozzle tip have greatly improved the life of the grid distributors in FCC service, these designs are still subject to erosive wear that requires periodic replacement of either individual nozzles in a grid arm or replacement of the entire grid arm. These types of repairs are difficult to make and can lengthen the time required to perform routine maintenance during scheduled down periods.

Another example of an air distributor used for FCC catalyst regeneration process is disclosed in U.S. Pat. No. 4,223,843. As disclosed therein, the air distributor includes a plurality of nozzles in a header ring and in a cylindrical housing, with each nozzle formed with a diverging bore for ejecting high pressure air. The diverging bore of each of the nozzles is formed at a half angle of less than 7° for providing a maximum air velocity without destruction of the spent catalyst.

U.S. Pat. No. 4,460,130 discloses an injector nozzle disposed external to the manifold having a central opening and an inlet extending from the nozzle to the central passage. The cross-sectional area of the central opening in the nozzle in the direction of flow is smaller at least at one point than that of the inlet such that a major portion of the pressure drop in the gas flowing from the central passage through the inlet and the nozzle is created by the nozzle. The central opening outwardly diverges at an angle of less than 15° to avoid jetting and formation of eddy currents.

There still exists a need in the art for gas distribution devices that are subject to less erosive wear.

SUMMARY OF THE DISCLOSURE

In one aspect, embodiments disclosed herein relate to an injection nozzle for use in a gas distribution device, the injection nozzle including: a tube having a fluid inlet and a fluid outlet; wherein the inlet comprises a plurality of flow restriction orifices.

In another aspect, embodiments disclosed herein relate to an injection nozzle for use in a gas distribution device, the injection nozzle including: a tube having a fluid inlet and a fluid outlet; wherein the fluid inlet comprises an annular orifice surrounding a flow restriction device.

In another aspect, embodiments disclosed herein relate to a gas distribution apparatus, including: a distribution manifold in fluid communication with a gas source and a plurality of injection nozzles; each of the plurality of injection nozzles including a fluid inlet disposed within the distribution manifold and a fluid outlet; wherein the fluid inlet comprises a plurality of flow restriction orifices. In some embodiments, the above described gas distribution apparatus may be disposed in a vessel, such as for distributing a gas in vessel for conducting polymerization reactions, spent catalyst regeneration, or coal gasification.

In another aspect, embodiments disclosed herein relate to a gas distribution apparatus, including: a distribution manifold in fluid communication with a gas source and a plurality of injection nozzles; each of the plurality of injection nozzles including a fluid inlet disposed within the distribution manifold and a fluid outlet; wherein the inlet comprises an annular orifice surrounding a flow restriction device. In some embodiments, the above described gas distribution apparatus may be disposed in a vessel, such as for distributing a gas in vessel for conducting polymerization reactions, spent catalyst regeneration, or coal gasification.

Other aspects and advantages will be apparent from the following description and the appended claims.

BRIEF DESCRIPTION OF DRAWINGS

FIG. 2A (cross-sectional view) and FIG. 2B (inlet end view) illustrate injection nozzles according to embodiments disclosed herein.

FIG. 3A (cross-sectional view) and FIG. 3B (inlet end view) illustrate injection nozzles according to embodiments disclosed herein.

FIG. 4A (cross-sectional view) and FIG. 4B (inlet end view) illustrate injection nozzles according to embodiments disclosed herein.

FIG. 5A (cross-sectional view) and FIG. 5B (inlet end view) illustrate injection nozzles according to embodiments disclosed herein.

FIG. 6A (cross-sectional view) and FIG. 6B (inlet end view) illustrate injection nozzles according to embodiments disclosed herein.

FIG. 7A (cross-sectional view) and FIG. 7B (inlet end view) illustrate injection nozzles according to embodiments disclosed herein.

FIG. 8A (cross-sectional view) and FIG. 8B (inlet end view) illustrate injection nozzles according to embodiments disclosed herein.

FIG. 9A (cross-sectional view) and FIG. 9B (inlet end view) illustrate injection nozzles according to embodiments disclosed herein.

FIGS. 15A-15K show sequential frames from CFD animation of a standard Borda tube injection nozzle that illustrate the movement and instability of the jet from the orifice and how the instability is present all the way to the end of the tube.

FIGS. 16-20 show the internal flow pattern for Borda tubes and modified Borda tubes based on CFD analysis.

FIGS. 21-25 show the internal flow pattern for injection nozzles according to embodiments disclosed herein based on CFD analysis.

FIGS. 26-31 compares the internal flow pattern for injection nozzles according to embodiments disclosed herein based on CFD analysis to that for standard Borda tubes.

DETAILED DESCRIPTION

Figure 1A:
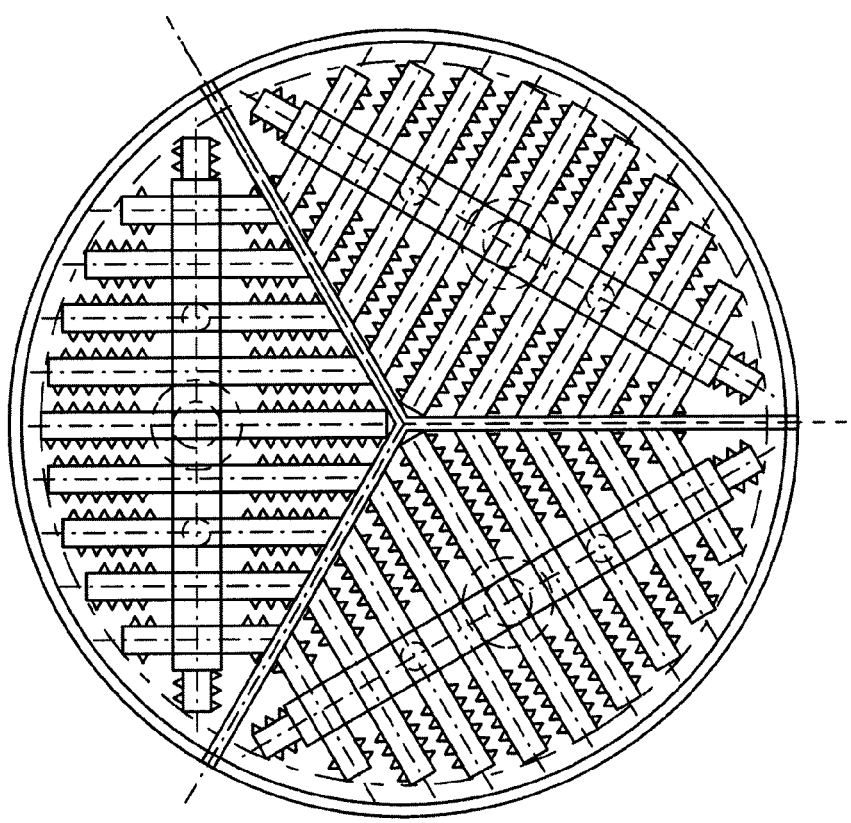
FIGS. 1A (plan view) and 1B (elevation view) illustrate a prior art pipe grid distributor.
Figure 1B:
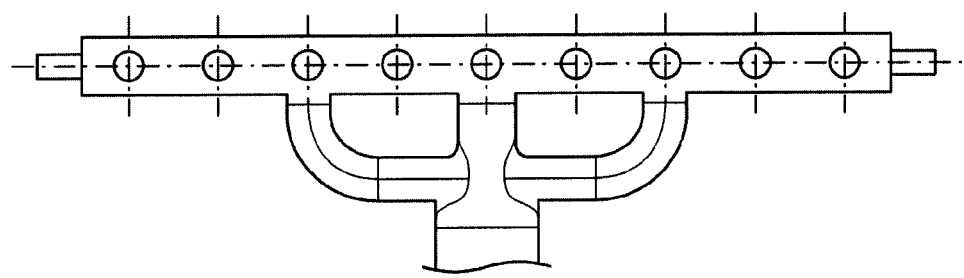
FIG. 1C is a cross-sectional view of a grid arm of the prior art pipe grid distributor of FIG. 1A, including a Borda tube injection nozzle.
FIG. 1D is a detail view of a Borda tube used in FIG. 1C.
FIGS. 1E-1H several perspective views of the Borda tube arrangement within the grid arm of FIG. 1C.
Figure 1C:
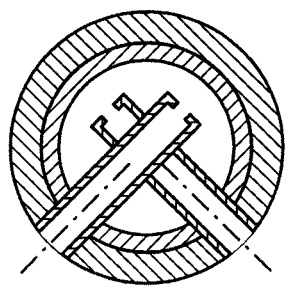
Figure 1D:
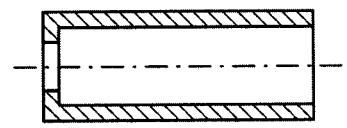
Figure 1E:
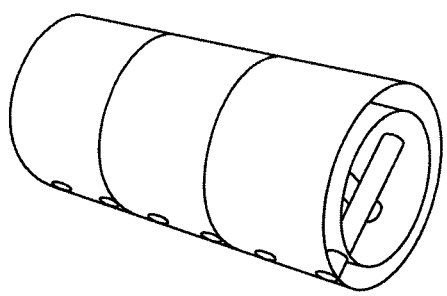
Figure 1F:
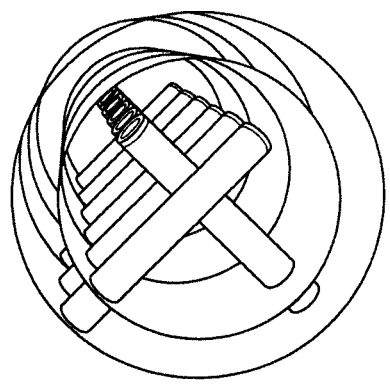
Figure 1G:
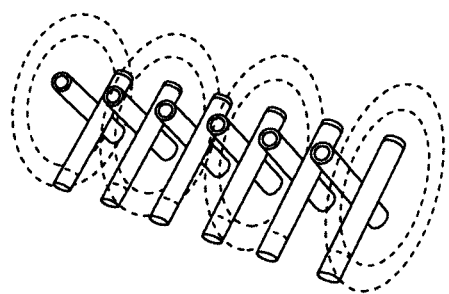
Figure 1H:
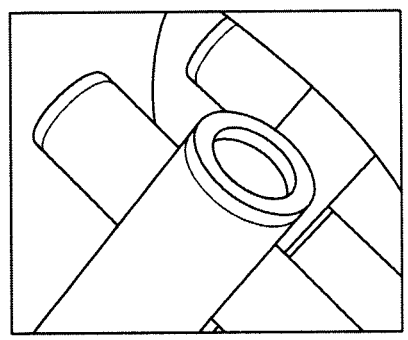

In one aspect, embodiments herein relate to an apparatus for the injection of a gaseous stream into a bed of fluidized solids. More specifically, embodiments disclosed herein relate to an injection nozzle that may result in a gas velocity profile so as to reduce or avoid erosion of the injection nozzle.

Injection nozzles may have a fluid inlet, in fluid communication with a gas distribution manifold, and a fluid outlet, in fluid communication with a vessel, for example. The fluid inlet of injection nozzles according to embodiments disclosed herein may include one or more fluid pathways parallel, perpendicular, or transverse to the nozzle axis. The fluid pathways may be designed and distributed on the nozzle so as to result in one or more of: a desired pressure drop across the nozzle; a stable gas velocity profile; a uniform velocity profile that may be centered with the nozzle outlet; and a maximum velocity less than that which may cause attrition of solid particles being fluidized.

Examples of injection nozzles according to embodiments disclosed herein are illustrated in FIGS. 2-9. Although features of the injection nozzles are illustrated in the Figures as generally circular/cylindrical, other shapes/profiles may be used, such as square, rectangular, hexagonal, octagonal, etc. As such, when referring to diameter herein, it is understood that the diameter is an equivalent diameter for shapes other than circular.

Referring now to FIGS. 2A (cross-sectional view) and 2B (inlet end view), an injection nozzle according to embodiments disclosed herein is illustrated. Injection nozzle 10 may include tube 12 having a fluid inlet end 14 and a fluid outlet 16. Fluid inlet 14 may be formed, for example, from a plurality of radial flow restriction orifices 17 distributed circumferentially through tube 12. As used herein, "plurality" refers to two or more, even if illustrated as having a different number. As shown in FIG. 2B, the inlet end may be capped with a back plate 18, having no flow openings, so as to only allow flow of gas radially into tube 12 via radial flow restriction orifices 17.

The number and diameter of the radial flow restriction orifices may depend upon the desired pressure drop through tube 10. The plurality of radial flow restriction orifices 17 may be distributed through the tube 12 in a circumferentially row. Other embodiments may include additional circumferential rows of radial flow restriction orifices.

A ratio of an inner diameter $D_T$ of the tube outlet to a diameter $D_O$ of a radial flow restriction orifice may be greater than 2:1. In other embodiments, the ratio of an inner diameter $D_T$ of the tube outlet to a diameter $D_O$ of a radial flow restriction orifice may be within the range from 2:1 to 20:1.

The plurality of radial flow restriction orifices may be disposed through the tube a length L from an inlet axial end of the tube proximate the inlet. In some embodiments, the length L may be less than 2 times the inner diameter of fluid outlet 14; less than 1.5 times the inner diameter of fluid outlet 14 in other embodiments, less than 1 times the inner diameter of fluid outlet 14 in other embodiments; and less than 0.5 times the inner diameter of fluid outlet 14 in yet other embodiments. In other embodiments, the radial flow restriction orifices may be positioned as close to the axial end as possible so as to provide both manufacturability and structural integrity.

Referring now to FIGS. 3A (profile view) and 3B (inlet end view), an injection nozzle according to embodiments disclosed herein is illustrated. Injection nozzle 20 may include tube 22 having a fluid inlet 24 and a fluid outlet 26. Fluid inlet 24 may be formed, for example, from a plurality of axial flow restriction orifices 27 distributed axially through inlet plate 28.

As shown in FIG. 3B, the axial flow orifices 26 may be distributed over inlet plate 28 using an even spacing. Use of an even spacing may allow for ease of manufacture, structural integrity. More importantly, evenly spaced axial flow restriction orifices may allow for development of a uniform, centered flow profile.

Comparing FIG. 3A and FIG. 4A, where like numerals represent like parts, axial flow restriction orifices 26 may have a length $L_o$ that may be tailored to achieve a desired pressure drop or velocity profile. In some embodiments, length $L_o$ may allow for flow within the axial flow restriction orifice 27 to stabilize, thus exiting the orifice at a more uniform velocity profile, correspondingly resulting in a more uniform velocity profile at fluid outlet 26. For example, length $L_o$ may be at least 4 times the diameter of an axial flow restriction orifice in some embodiments; at least 5 times the diameter of an axial flow restriction orifice in yet other embodiments.

The length from an orifice outlet end 32 to fluid outlet 24 should also be sufficient to develop a stable, uniform velocity profile. In some embodiments, a ratio of an axial length of the tube to an axial length of the plurality of flow restriction orifices may be at least 4:1; within the range from 5:1 to 50:1 in other embodiments.

The number and diameter of the axial flow restriction orifices may also depend upon the desired pressure drop through tube 20. In some embodiments, a ratio of an inner diameter of the tube outlet to a diameter of an axial flow restriction orifice is greater than 2:1; within the range from 2:1 to 20:1 in other embodiments.

As illustrated in FIGS. 5A (profile view) and 5B (inlet end view), where like numerals represent like parts, axial flow restriction orifices 26 may be tapered. For example, axial flow orifices 26 may increase in diameter from an orifice inlet end 30 to an orifice outlet end 32, where the outer diameter may taper at an angle $\alpha$ up to about 15° in some embodiments; at an angle $\alpha$ between about 5° and 15° in other embodiments; and at an angle $\alpha$ between 7.5° and 12.5° in yet other embodiments.

Referring now to FIGS. 6A (profile view) and 6B (inlet end view), an injection nozzle according to embodiments disclosed herein is illustrated. Injection nozzle 60 may include tube 62 having a fluid inlet 64 and a fluid outlet 66. Fluid inlet 64 may be formed, for example, as an annular orifice 68 surrounding a flow restriction device 70. As illustrated in FIG. 6A, flow restriction device 70 may include a disk 70D, appropriately suspended in the center of the inlet end of tube 62.

The width W of annular orifice 68 may depend upon the desired pressure drop through nozzle 60, among other factors. In some embodiments, a diameter of disk 70D may range from 0.5 to 0.95 times the inner diameter of tube 62; from 0.6 to 0.85 times the inner diameter of tube 62 in other embodiments.

Comparing FIG. 6A and FIG. 7A, where like numerals represent like parts, flow restriction device 70 may have a length $L_A$ that may be tailored to achieve a desired pressure drop or velocity profile. In some embodiments, length $L_A$ may allow for flow within the annular orifice 68 to stabilize, thus exiting the orifice at a more uniform velocity profile, correspondingly resulting in a more uniform velocity profile at fluid outlet 66. For example, length $L_A$ may be at least 4 times width W; at least 5 times width W in yet other embodiments.

The length from an annular orifice outlet end 72 to fluid outlet 66 should also be sufficient to develop a stable, uniform velocity profile. In some embodiments, a ratio of an axial length $L_T$ of the tube to a length $L_A$ of the annular flow orifice may be at least 4:1; within the range from 5:1 to 50:1 in other embodiments.

As illustrated in FIGS. 8A (profile view), 8B (inlet end view), 9A (profile view), and 9B (inlet end view), where like numerals represent like parts, annular flow orifice 66 may be tapered, such as through use of a flow restriction device 70C that may be conical. For example, annular flow orifice 68 may increase in diameter from an orifice inlet end 72 to an orifice outlet end 74, where the outer diameter may taper at an angle $\beta$ up to about 15° in some embodiments; at an angle $\beta$ between about 5° and 15° in other embodiments; and at an angle $\beta$ between 7.5° and 12.5° in yet other embodiments. As illustrated in FIG. 9A, the outlet end of conical flow restriction device 70C may be truncated (resulting in a frustoconical flow restriction device 70F).

Injection nozzles according to embodiments disclosed herein, as described above, may provide for a stable velocity profile. Such injection nozzles may provide for a uniform velocity profile centered at the nozzle outlet. Injection nozzles according to embodiments disclosed herein may avoid generation of areas having a high velocity or localized jets that may cause particle attrition. Additionally, injection nozzles disclosed herein may avoid generation of areas having a negative axial velocity proximate the nozzle outlet, thus resulting in a low nozzle erosion rate.

Injection nozzles described above may be disposed in a gas distribution apparatus. Injection nozzles according to embodiments disclosed herein may be used with all types of distribution apparatus where only a gaseous phase is being distributed into a bed of fluidized solids. For example, distributors may include a flat plate distributor, a pipe grid system, a ring distributor, a dome-type distributor, and a mushroom distributor, among others. Such distributors may be disposed in vessels for performing various reactions or mass transfer between the gas and solids, including FCC catalyst regeneration vessels, gas-phase polymerization vessels, coal gasification, and iron ore reduction, among others.

Figure 10:
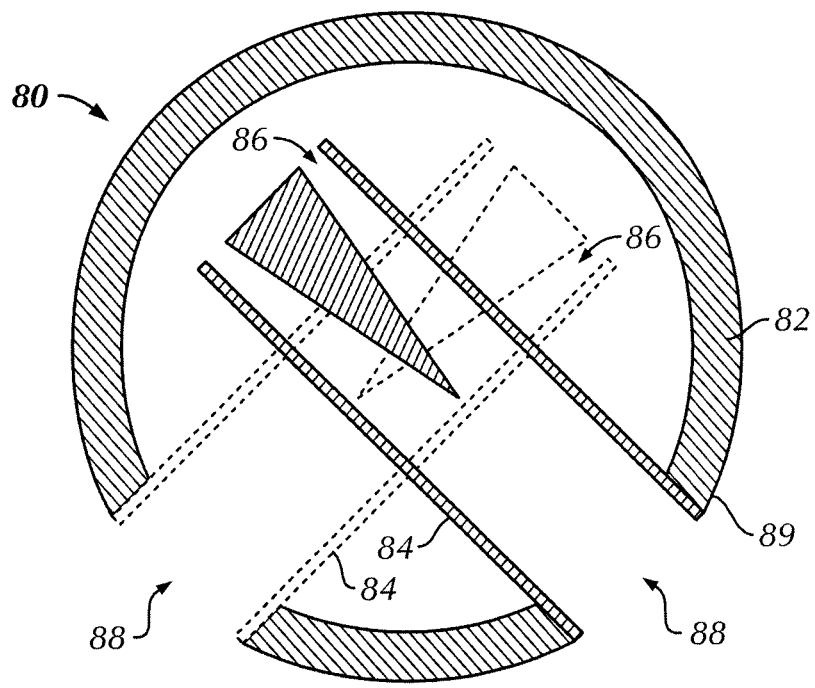
FIG. 10 is a cross-sectional view of a pipe distributor grid arm including injection nozzles according to embodiments disclosed herein.
Figure 11:
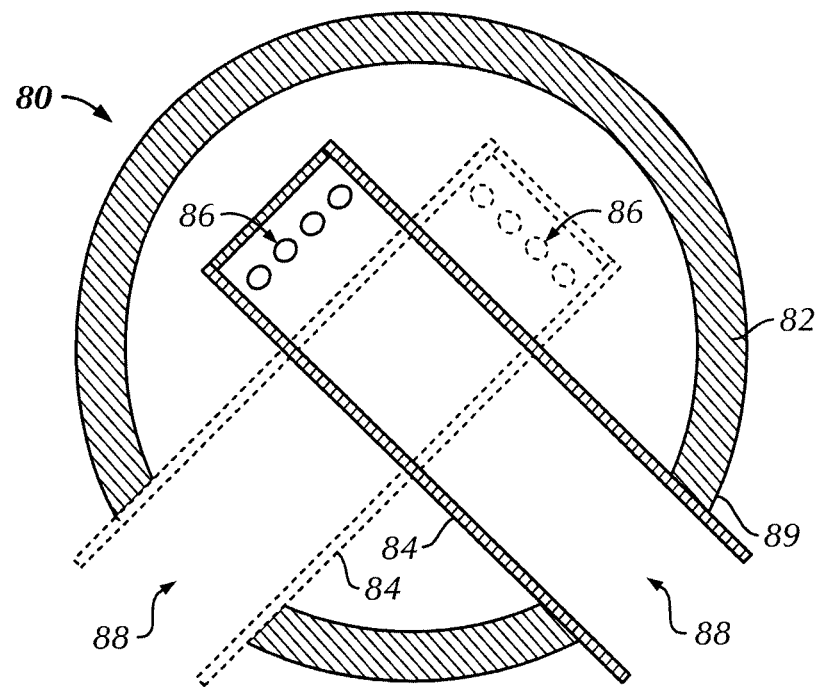
FIG. 11 is a cross-sectional view of a pipe distributor grid arm including injection nozzles according to embodiments disclosed herein.

Referring now to FIGS. 10 and 11, where like numerals represent like parts, injection nozzles according to embodiments disclosed herein, disposed in a gas distribution apparatus, are illustrated. Gas distribution apparatus 80 may include a ring type distributor (not illustrated) having a gas distribution manifold 82 in fluid communication with a gas source and a plurality of injection nozzles 84. Each of the injection nozzles may include a fluid inlet 86 disposed within the distribution manifold and a fluid outlet 88. In some embodiments, such as shown in FIG. 10, the fluid outlet 88 may be located proximate an outer circumference 89 of gas distribution manifold 82. In other embodiments, such as shown in FIG. 11, the fluid outlet 88 may terminate at a point external to gas distribution manifold 82.

Figure 12:
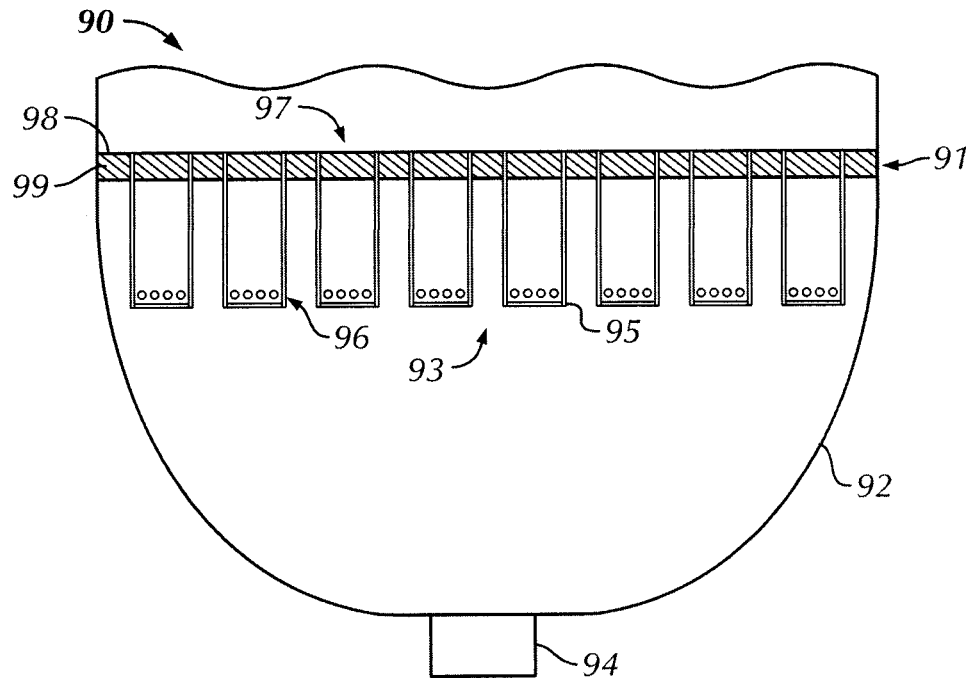
FIG. 12 is a cross sectional view of a vessel including a flat plate distributor including injection nozzles according to embodiments disclosed herein.
Figure 13:
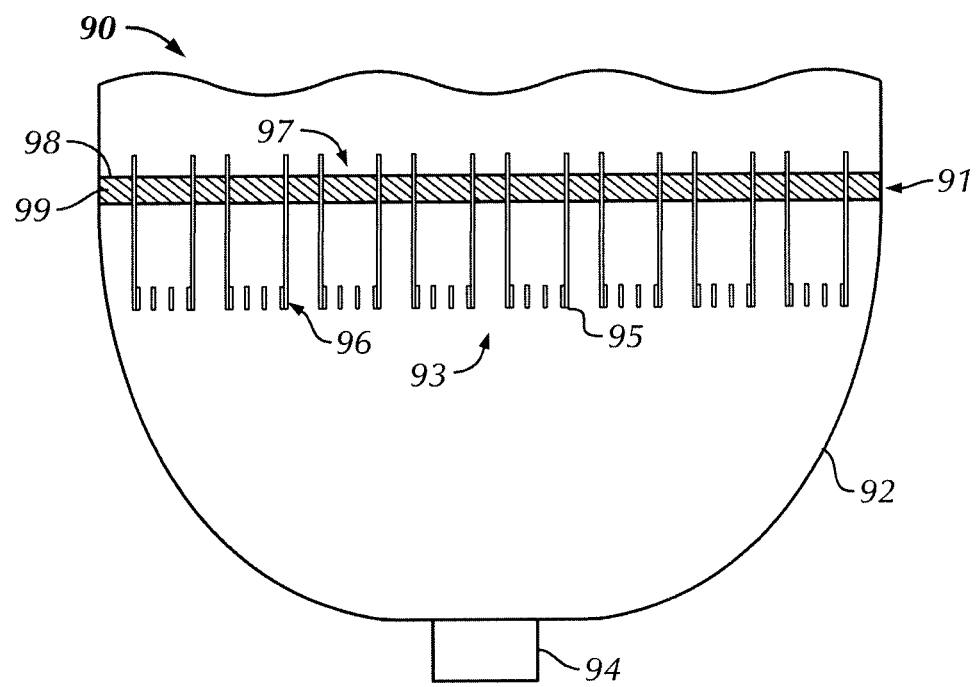
FIG. 13 is a cross sectional view of a vessel including a flat plate distributor including injection nozzles according to embodiments disclosed herein.

Similarly, referring now to FIGS. 12 and 13, where like numerals represent like parts, injection nozzles according to embodiments disclosed herein, disposed in a gas distribution apparatus, are illustrated. Gas distribution apparatus 90 may include a flat plate distributor 91 within a vessel 92, having a gas distribution manifold 93 in fluid communication with a gas source 94 and a plurality of injection nozzles 95. Each of the injection nozzles may include a fluid inlet 96 disposed within the distribution manifold and a fluid outlet 97. In some embodiments, such as shown in FIG. 12, the fluid outlet 97 may be located proximate a top surface 98 of flat plat 99. In other embodiments, such as shown in FIG. 13, the fluid outlets 97 may terminate at a point above top surface 98 of flat plate 99.

As mentioned above, injection nozzles according to embodiments disclosed herein may be used in gas distribution apparatus used for FCC catalyst regeneration, for example. Injection nozzles according to embodiments disclosed herein may additionally be used in other portions of a cracking process as well, such as illustrated in and described with respect to FIG. 1 of U.S. Pat. No. 5,314,610, which is incorporated herein by reference. As described in the '610 patent, gas distribution apparatus may be used for injection of a stripping medium, such as steam or nitrogen, into a catalytic cracking reaction vessel, or for injection of oxygen or air for combustion and removal of coke from a spent catalyst.

EXAMPLES

The following examples are derived from modeling techniques and although the work was actually achieved, the inventors do not present these examples in the past tense to comply with applicable rules.

Simulations of injection nozzles according to embodiments disclosed herein are compared to Borda tubes and modified Borda tubes using "computational fluid dynamics" (CFD). CFD is used to examine and compare the flow patterns resulting from a given injection nozzle configuration, as illustrated in FIGS. 14-17. As will be shown, injection nozzles according to embodiments disclosed herein may reduce the potential for flow instabilities and potential for erosive wear at the nozzle tip. The CFD studies are conducted using identical conditions for each injection nozzle configuration simulated such that the air flows and pressure drops were the same for each design.

Comparative Example 1

Figure 14A:
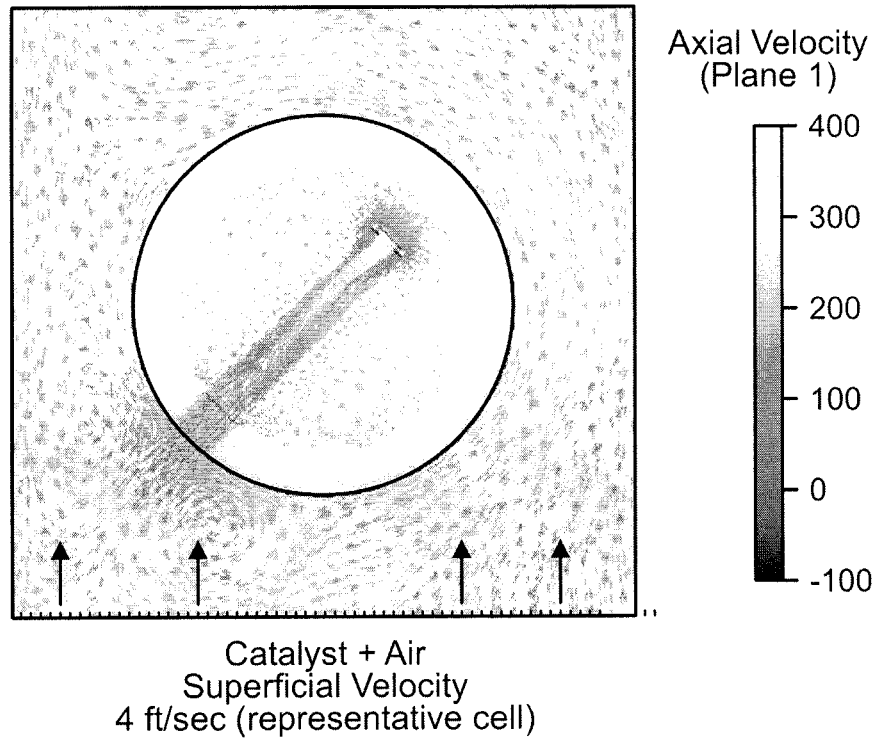
FIG. 14A-14E show the internal flow pattern for a standard Borda tube injection nozzle as developed from computation fluid dynamics (CFD) analysis.

Referring to FIGS. 14A-14E, CFD results for a standard Borda type injection nozzle that is widely used for gas distributors in fluidized beds is illustrated. The nozzle is 9 inches in length, has an inner diameter at the outlet of 1.5 inches, and the inlet orifice is 1.04 inches in diameter. FIG. 14A is a cross-section of a gas distribution header, showing the flow velocity vectors inside the header, the Borda tube, and the surrounding bed of solids. As would be expected, there is a high velocity jet as the gas accelerates through the orifice and diverges into the larger diameter of the Borda tube downstream of orifice.

Figure 14B:
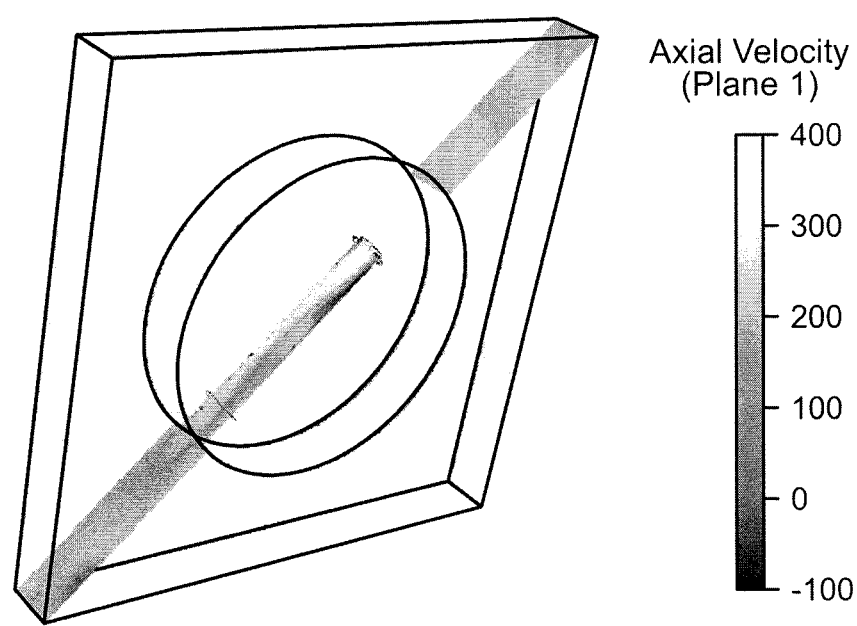

FIG. 14B shows the velocity vectors on a single plane that cuts through a cross section of the header and Borda tube and out into a bed of solids. The plane is oriented so as to be parallel to the direction of the general gas flow in the header. The CFD results indicate that the gas jet exiting the orifice is influenced by the gas flow in the header. Moreover, the animated CFD shows that the gas jet is not stable, but sways from side-to-side inside the Borda tube.

Figure 14C:
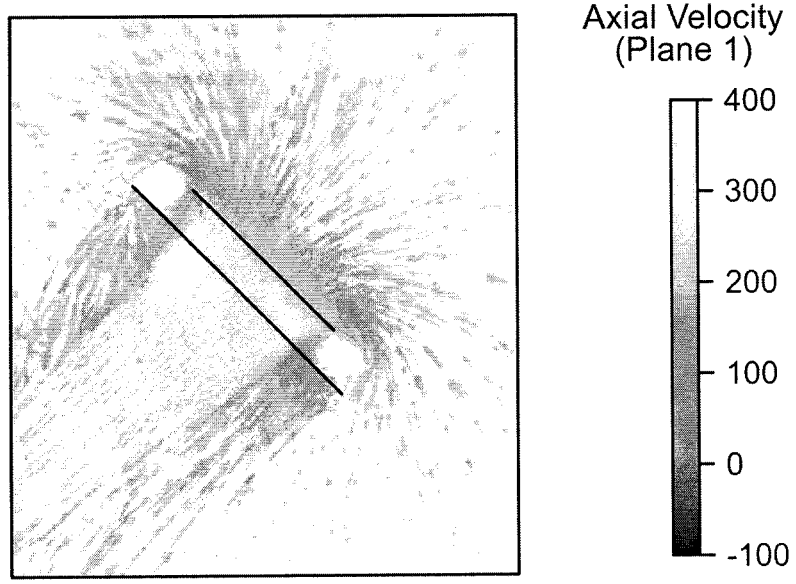
Figure 14D:
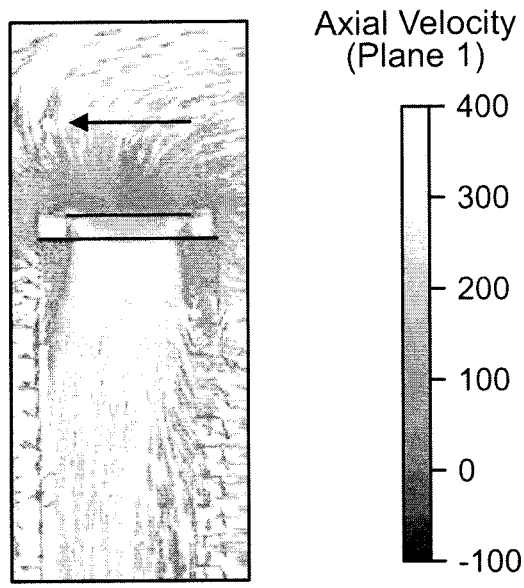

FIGS. 14C and 14D are a close up snapshot of the gas jet from the orifice viewed from two different directions, one view being in the direction of the gas flow in the header and the second view being perpendicular to the direction of the gas flow. It is clear from these views that the jet from the orifice is being influenced by the flow of gas in the header.

Figure 14E:
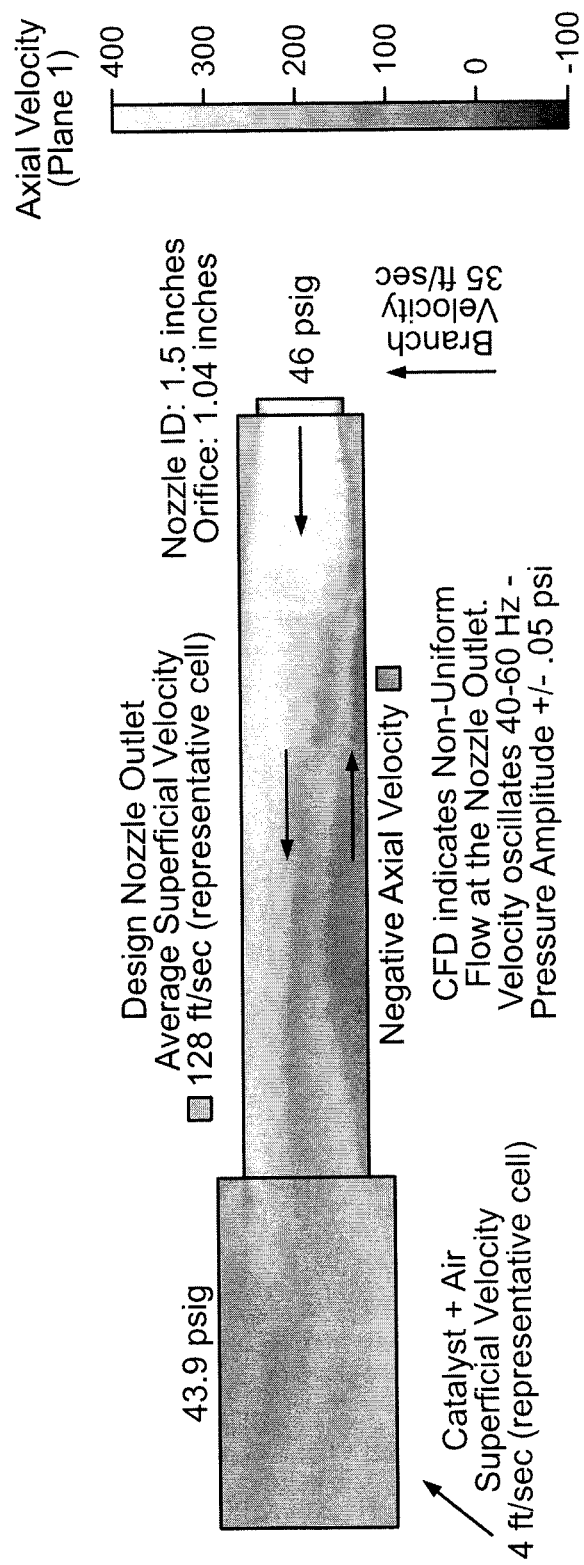

FIG. 14E is a view along a single plane through the center of the Borda tube with the orientation of the plane being parallel to the direction of gas flow in the header. It is surprising to find that the instability of the gas jet persists beyond the end of the nozzle and into the bed of fluidized solids despite the nozzle having the minimum recommended length to diameter ratio (LID) of 6.0. Moreover, the instability of the gas jet actually results in a negative axial velocity in one part of the tube. The animated version of the CFD study shows that the negative velocity region is not stable, but moves from side to side in the tube, as illustrated in FIG. 15A, an end view of the nozzle inlet, and FIGS. 15B-15K, which contain sequential (equal time interval) snapshots from the CFD analysis of a Borda tube injection nozzle showing how the jet moves from side to side in the Borda tube. It is clear from these results that this nozzle design may allow solids to backflow into the region of negative axial velocity only to be picked up and ejected at high velocity when the gas jet reverses sides in the tube. The behavior of the unstable gas jet coincides with observed wear pattern on these types of nozzles after use for a period of time.

Comparative Examples 2-5

Referring now to FIGS. 16-20 (Comparative Examples 1-5), snapshot views along an axial plane through various injection modified Borda tube configurations are illustrated. All of the injection nozzles are evaluated under the same conditions of inlet pressure with the orifice openings sized to provide a constant pressure drop of 2.1 psi across the injector. Each nozzle is 9 inches in length and has a 1.5 inch inner diameter (L/D of 6).

Comparative Example 1 (Repeat)

FIG. 16 is the standard Borda tube with a single orifice, as previously shown in FIGS. 14 and 15, shown again here for reference.

Comparative Example 2

In FIG. 17, the Borda tube includes a double orifice (each ¼-inch in length and having a diameter of 1.04 inches) with a 0.75-inch space between the orifices. The CFD results indicate no improvement in the stability of the jet or the presence of regions of negative axial velocity in the nozzle tube as compared to a standard Borda tube.

Comparative Example 3

In FIG. 18, the orifice includes a short sloped section on the downstream end. Again, the CFD results indicate no improvement in the stability of the jet or the presence of regions of negative axial velocity in the nozzle tube.

Comparative Example 4

In FIGS. 19A (profile view) and 19B (end view of nozzle inlet), the thickness of the orifice is increased from ¼-inch to 1-inch in length. This arrangement demonstrates less instability in the CFD results. However, the region of negative axial velocity is still present although the location of the negative velocity region is more stable.

Comparative Example 5

In FIGS. 20A (profile view) and 20B (end view of nozzle inlet), the thick nozzle includes a long sloped region at the outlet end of the orifice. This arrangement demonstrates a very stable velocity profile. However, the gas jet is not centered in the tube and there is a relatively large, though stable, area of negative axial velocity.

The CFD analyses of a Borda tube and modified Borda tubes in FIGS. 16-20 exhibit unstable flow and/or negative axial velocity, each of which is an undesired flow characteristic of a gas injection nozzle.

Examples 1-5

Referring now to FIGS. 21-25 (Examples 1-5), snapshot views along an axial plane through injection nozzles according to embodiments disclosed herein are illustrated. All of the injection nozzles are evaluated under the same conditions as Comparative Examples 1-5 (same inlet pressure with the orifice openings sized to provide a constant pressure drop of 2.1 psi across the injector). Each nozzle is 9 inches in length and has a 1.5 inch inner diameter (LID of 6).

Example 1

FIGS. 21A (profile view) and 21B (end view of nozzle inlet) illustrate a CFD analysis of an orifice similar to that illustrated in the embodiments described with relation to FIGS. 6A and 6B. The orifice configuration includes an annular opening surrounding a flat disk (0.75 inches in diameter and ¼-inch in length suspended in the center at the inlet of the injection nozzle. This nozzle has a very stable velocity profile. However, the velocity profile is not centered at the outlet. Additionally, there may be localized regions where backflow might occur and the nozzle may be difficult to manufacture.

Example 2

FIGS. 22A (profile view) and 22B (end view of nozzle inlet) illustrate a CFD analysis of an orifice similar to that illustrated in the embodiment described with relation to FIGS. 9A and 9B. The orifice configuration includes a tapered cone suspended at the inlet of the nozzle to form the annular orifice opening. This nozzle performs as well as that of FIGS. 21A and 21B from a stability standpoint, but shows improvement in that the velocity profile is almost perfectly centered in the nozzle tube. However, the nozzle may be difficult to manufacture.

Example 3

FIGS. 23A (profile view) and 23B (end view of nozzle inlet) illustrate a CFD analysis of an orifice similar to that illustrated in the embodiment described with relation to FIGS. 3A and 3B. The orifice configuration includes seven (7) smaller orifices to provide the same pressure drop as the single orifice arrangement. This arrangement exhibits a fairly stable velocity profile, and, the velocity profile at the nozzle exit is very uniform. There are some areas of negative axial velocity, but these are confined to the inlet half of the nozzle and do not reach the nozzle tip.

Example 4

FIGS. 24A (profile view) and 24B (end view of nozzle inlet) illustrate a CFD analysis of an orifice similar to that illustrated in the embodiment described with relation to FIGS. 4A and 4B. The orifice configuration includes a multi-orifice (7 hole) arrangement similar to Example 3, except that the thin orifice plate (¼-inch) has been replaced with a thick (1-inch) plate. The inclusion of the thick orifice plate improves the stability of the velocity profile compared to Example 3, while also showing a very uniform velocity profile at the injection nozzle outlet. Moreover, the point at which the velocity profile becomes uniform occurs sooner than with the thin orifice arrangement of Example 3.

Example 5

FIGS. 25A (profile view) and 25B (end view of nozzle inlet) illustrate a CFD analysis of an orifice similar to that illustrated in the embodiment described with relation to FIGS. 2A and 2B. The orifice configuration includes a multi-orifice arrangement with eight (8) holes that have been moved to the side of the tube rather than being placed on the back plate. There are no openings on the back plate. Again, the orifice area is sized to provide the same overall nozzle pressure drop of 2.1 psi as maintained for all previous arrangements. The CFD studies show that this arrangement results in a stable, uniform velocity profile. In the animated CFD result, there is almost no movement detected in the velocity profile. Moreover, the nozzle design is easy to manufacture relative to the standard Borda tube of Comparative Example 1.

Example 6

FIGS. 26-31 compare CFD analyses of orifice similar to that illustrated in FIGS. 2A and 2B with a CFD analysis of the standard Borda tube of Comparative Example 1 (illustrated in FIG. 16 and repeated as FIGS. 27, 29, and 31 for convenience, where 27A, 29A, and 31A represent a profile view, and 27B, 29B, and 31B represent an end view of the nozzle inlet). The orifice configurations include multi-orifice arrangements with eight (8) holes (FIGS. 26A (end view) and 26B (profile view of nozzle inlet), six (6) holes (FIGS. 28A (end view) and 28B (profile view of nozzle inlet), and four (4) holes (FIGS. 30A (end view) and 30B (profile view of nozzle inlet) that have been moved to the side of the tube rather than being placed on the back plate. There are no openings on the back plate. Again, the orifice area is sized to provide the same overall nozzle pressure drop of 2.1 psi as maintained for all previous arrangements. The CFD studies show that these arrangements result in stable, uniform velocity profiles (reduced oscillation over time) compared to the standard Borda Tube. The CFD studies also show that moving from eight (8) to six (6) to four (4) openings improved uniformity in the outlet velocity.

As described above, injection nozzles according to embodiments disclosed herein may advantageously provide for one or more of a stable velocity profile, a uniform velocity at the injection nozzle outlet, and limited regions having a negative flow velocity. Advantageously, such injection nozzles may result in one or more of decreased erosion, decreased catalyst attrition, and improved gas distribution.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A process of cracking a hydrocarbon feedstock, such as a fluid catalytic cracking (FCC) process, the process comprising:
   contacting hot regenerated catalyst particles from a catalyst regenerator with a hydrocarbon feed in a riser reactor to form an effluent comprising a cracked hydrocarbon product and a spent catalyst;
   separating the spent catalyst from the cracked hydrocarbon product in a separation vessel via a stripping medium fed through a first gas distribution apparatus to recover an overheads hydrocarbon fraction and a spent catalyst fraction;
   regenerating the spent catalyst fraction in a regeneration vessel via contact with a regeneration gas fed through a second gas distribution apparatus to recover the hot regenerated catalyst particles;
   wherein at least one of the first gas distribution apparatus and the second gas distribution apparatus comprises:
      a distribution manifold in fluid communication with a gas source and a plurality of injection nozzles;
      each of the plurality of injection nozzles comprising a tube having a fluid inlet disposed within the distribution manifold and a fluid outlet; and
      wherein the fluid inlet comprises a plurality of radial flow restriction orifices distributed circumferentially through the tube,
      wherein the plurality of radial flow restriction orifices are disposed through the tube a length L from an axial end of the tube proximate the inlet, wherein the length L is less than 2 tube inner diameters.

2. The process of claim 1, wherein the fluid outlet is proximate an outer circumference of the distribution manifold.

3. The process of claim 1, wherein the fluid outlet is external to an outer circumference of the distribution manifold.

4. The process of claim 1, wherein an axial end of the tube proximate the plurality of radial flow restrictions orifices is capped.

5. The process of claim 1, wherein a ratio of an inner diameter of the fluid outlet to a diameter of a radial flow restriction orifice is greater than 2:1.

6. The process of claim 1, wherein the plurality of flow restriction orifices are axially aligned with the tube.

7. The process of claim 6, wherein a ratio of an axial length of the tube to an axial length of the plurality of flow restriction orifices is at least 4:1.

8. The process of claim 6, wherein a ratio of an inner diameter of the fluid outlet to a diameter of a flow restriction orifice is greater than 2:1.

9. The process of claim 1, wherein a length of the tube is at least 5 times an inner diameter of the fluid outlet.

10. A process of cracking a hydrocarbon feedstock, such as a fluid catalytic cracking (FCC) process, the process comprising:
    contacting hot regenerated catalyst particles from a catalyst regenerator with a hydrocarbon feed in a riser reactor to form an effluent comprising a cracked hydrocarbon product and a spent catalyst;
    separating the spent catalyst from the cracked hydrocarbon product in a separation vessel via a stripping medium fed through a first gas distribution apparatus to recover an overheads hydrocarbon fraction and a spent catalyst fraction;
    regenerating the spent catalyst fraction in a regeneration vessel via contact with a regeneration gas fed through a second gas distribution apparatus to recover the hot regenerated catalyst particles;
    wherein at least one of the first gas distribution apparatus and the second gas distribution apparatus comprises:
       a distribution manifold in fluid communication with a gas source and a plurality of injection nozzles;
       each of the plurality of injection nozzles comprising a tube having a fluid inlet disposed within the distribution manifold and a fluid outlet;
       wherein the fluid inlet comprises an annular orifice surrounding a flow restriction device; and
       wherein the fluid outlet is external to an outer circumference of the distribution manifold.

11. The process of claim 10, wherein the fluid outlet is proximate an outer circumference of the distribution manifold.

12. The process of claim 10, wherein the flow restriction device comprises a disk suspended in the center of the inlet.

13. The process of claim 10, wherein the flow restriction device comprises a disk suspended in the center of the inlet.

14. The process of claim 10, wherein the flow restriction device is conical or frustoconical.

15. The process of claim 10, wherein a width of the annular orifice is between 0.05 and 0.25 times an inner diameter of the tube.

16. The process of claim 10, wherein a length of the flow restriction device is between 0.1 and 0.9 times a length of the tube.

17. A process of cracking a hydrocarbon feedstock, such as a fluid catalytic cracking process, the process comprising:
    contacting hot regenerated catalyst particles from a catalyst regenerator with a hydrocarbon feed in a riser reactor to form an effluent comprising a cracked hydrocarbon product and a spent catalyst;
    separating the spent catalyst from the cracked hydrocarbon product in a separation vessel via a stripping medium fed through a first gas distribution apparatus to recover an overheads hydrocarbon fraction and a spent catalyst fraction;
    regenerating the spent catalyst fraction in a regeneration vessel via contact with a regeneration gas fed through a second gas distribution apparatus to recover the hot regenerated catalyst particles;
    wherein at least one of the first gas distribution apparatus and the second gas distribution apparatus comprises:
       a distribution manifold in fluid communication with a gas source and a plurality of injection nozzles;
       each of the plurality of injection nozzles comprising a tube having a fluid inlet disposed within the distribution manifold and a fluid outlet; and
       wherein a length of the tube is at least 5 times an inner diameter of the fluid outlet.

18. A process of cracking a hydrocarbon feedstock, such as a fluid catalytic cracking process, the process comprising:
    contacting hot regenerated catalyst particles from a catalyst regenerator with a hydrocarbon feed in a riser reactor to form an effluent comprising a cracked hydrocarbon product and a spent catalyst;
    separating the spent catalyst from the cracked hydrocarbon product in a separation vessel via a stripping medium fed through a first gas distribution apparatus to recover an overheads hydrocarbon fraction and a spent catalyst fraction;
    regenerating the spent catalyst fraction in a regeneration vessel via contact with a regeneration gas fed through a second gas distribution apparatus to recover the hot regenerated catalyst particles;
    wherein at least one of the first gas distribution apparatus and the second gas distribution apparatus comprises:

a distribution manifold in fluid communication with a gas source and a plurality of injection nozzles;

each of the plurality of injection nozzles comprising a tube having a fluid inlet disposed within the distribution manifold and a fluid outlet;

wherein the fluid inlet comprises an annular orifice surrounding a flow restriction device; and wherein a width of the annular orifice is between 0.05 and 0.25 times an inner diameter of the tube.

19. A process of cracking a hydrocarbon feedstock, such as a fluid catalytic cracking process, the process comprising:

contacting hot regenerated catalyst particles from a catalyst regenerator with a hydrocarbon feed in a riser reactor to form an effluent comprising a cracked hydrocarbon product and a spent catalyst;

separating the spent catalyst from the cracked hydrocarbon product in a separation vessel via a stripping medium fed through a first gas distribution apparatus to recover an overheads hydrocarbon fraction and a spent catalyst fraction;

regenerating the spent catalyst fraction in a regeneration vessel via contact with a regeneration gas fed through a second gas distribution apparatus to recover the hot regenerated catalyst particles;

wherein at least one of the first gas distribution apparatus and the second gas distribution apparatus comprises:

a distribution manifold in fluid communication with a gas source and a plurality of injection nozzles;

each of the plurality of injection nozzles comprising a tube having a fluid inlet disposed within the distribution manifold and a fluid outlet;

wherein the fluid inlet comprises an annular orifice surrounding a flow restriction device; and wherein a length of the flow restriction device is between 0.1 and 0.9 times a length of the tube.

* * * * *